T. J. MULLEN & T. F. BRENNAN.
SHOCK ABSORBER.
APPLICATION FILED JULY 19, 1911.
1,034,023.
Patented July 30, 1912.
4 SHEETS—SHEET 2.
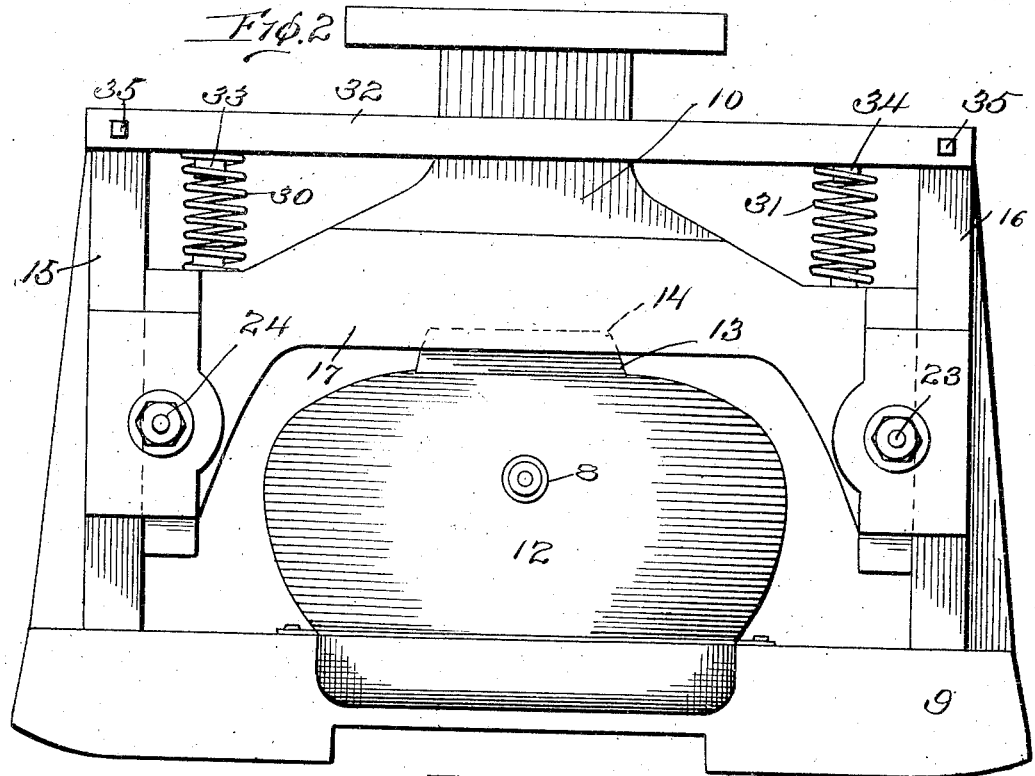
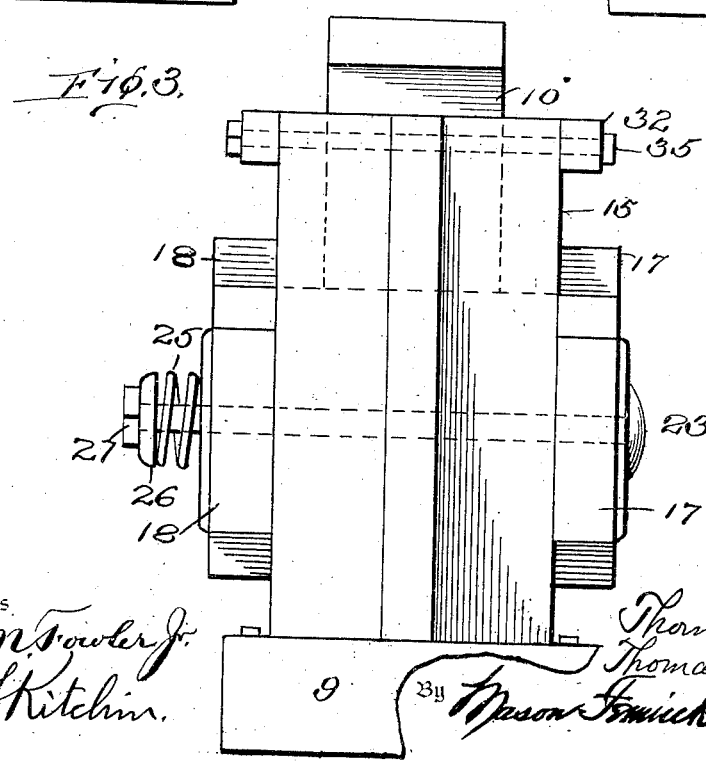

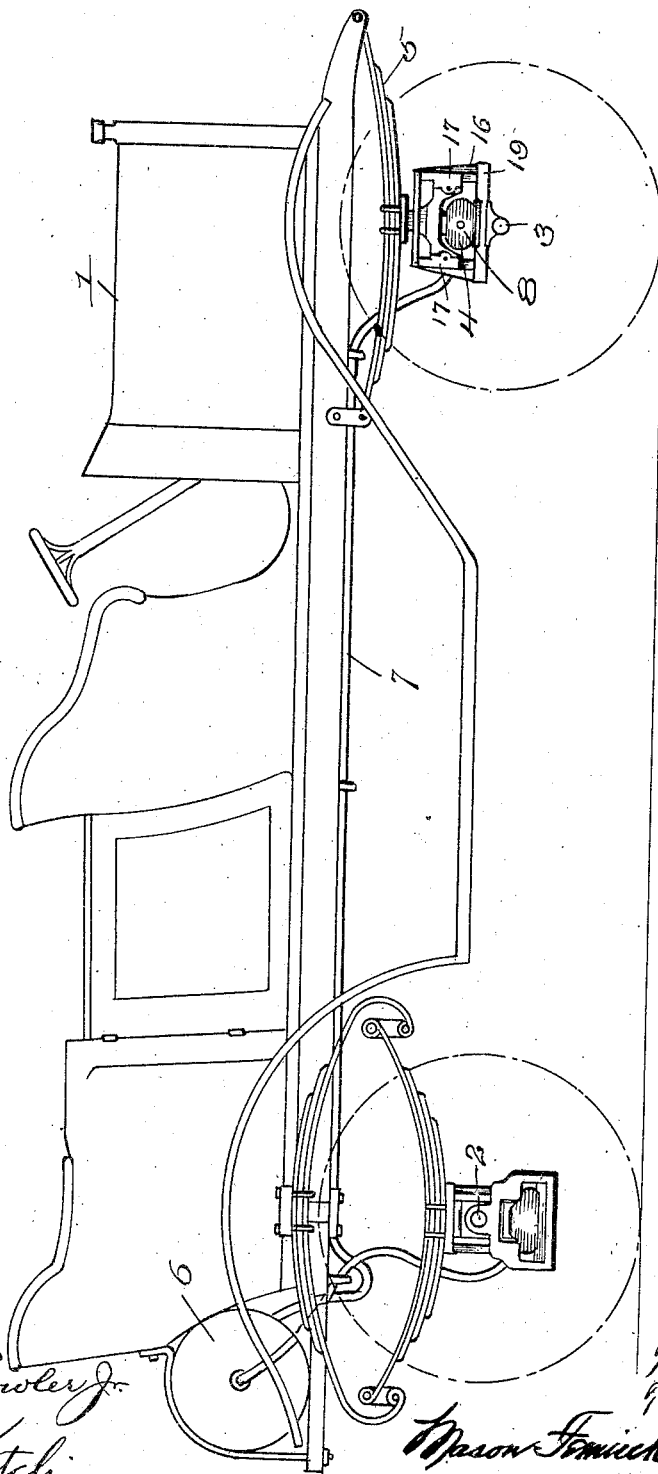

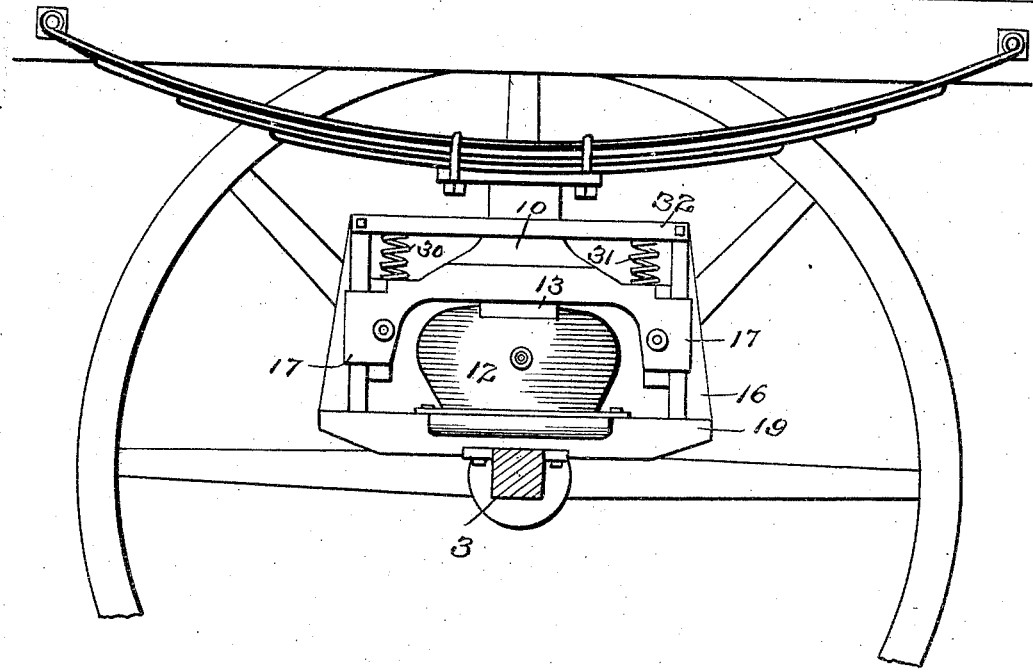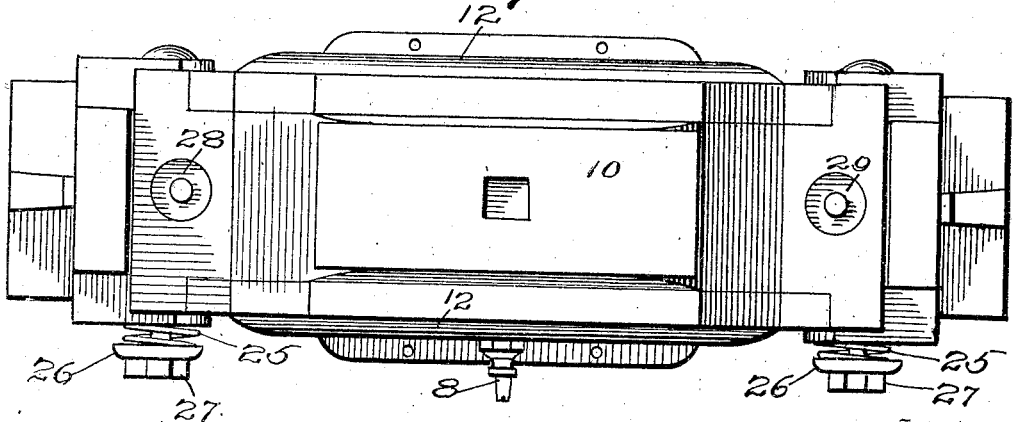

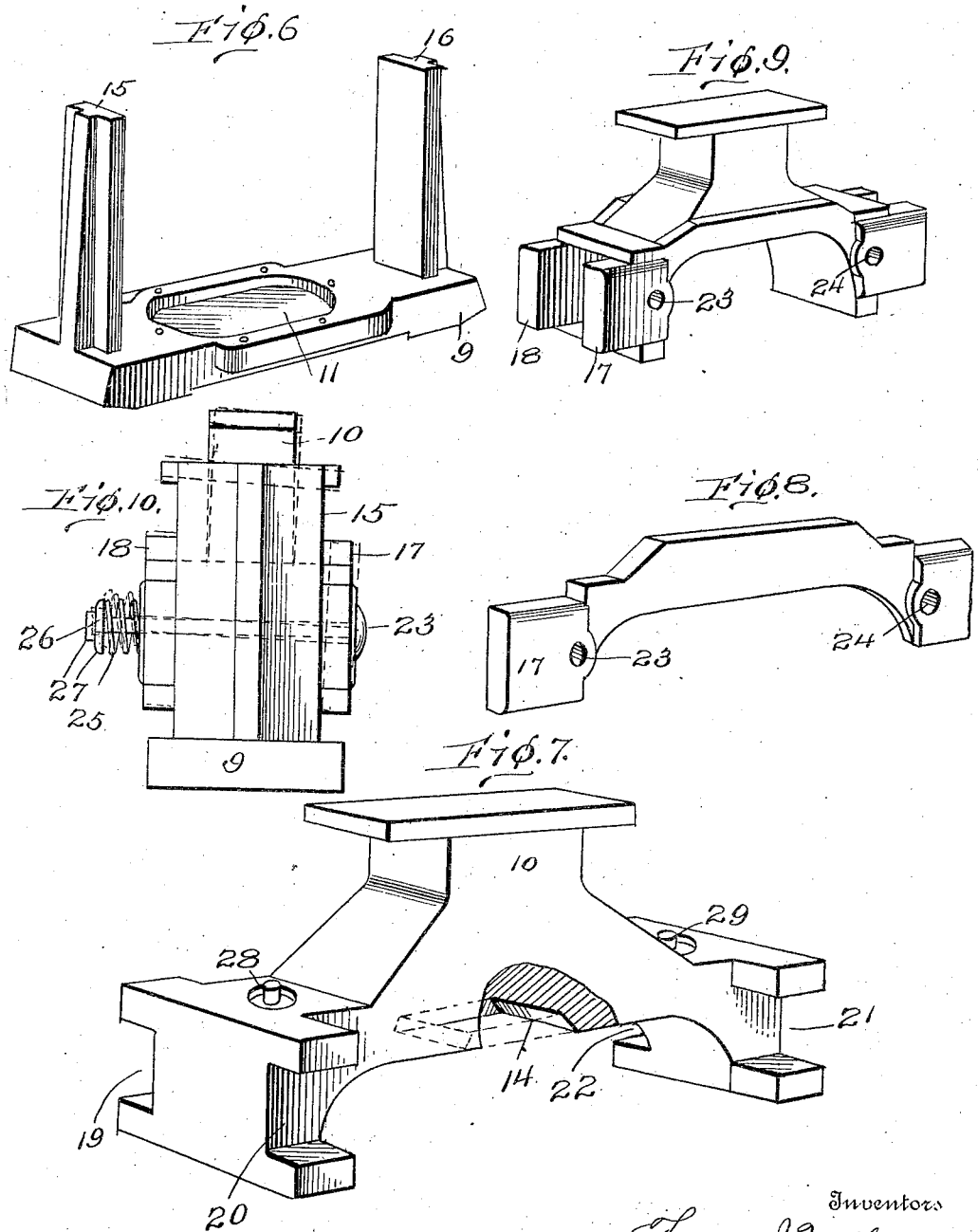

UNITED STATES PATENT OFFICE.

THOMAS J. MULLEN AND THOMAS F. BRENNAN, OF NEW BRIGHTON, NEW YORK.

SHOCK-ABSORBER.

1,034,023.   Specification of Letters Patent.   Patented July 30, 1912.

Application filed July 19, 1911. Serial No. 609,316.

*To all whom it may concern:*

Be it known that we, THOMAS J. MULLEN and THOMAS F. BRENNAN, citizens of the United States, residing at New Brighton, in the county of Richmond and State of New York, have invented certain new and useful Improvements in Shock-Absorbers; and we do hereby declare the following to be a full, clear, and exact description of the invention, such as will enable others skilled in the art to which it appertains to make and use the same.

This invention relates to improvements in springs for vehicles, and particularly to pneumatic shock absorbers arranged with an air bag for acting as a cushion or spring.

The object in view is the arrangement of an air bag adapted to be placed between the body of the vehicle and the axle thereof, associated with means for holding the bag in position at all times and causing the same to sustain the weight of the body of the vehicle and to absorb substantially all of the shocks.

Another object of the invention is the arrangement in a shock absorber, of improved means for utilizing the effect of an air bag, the same comprising a supporting frame and a reciprocating frame, associated with means for taking up the rebound, and improved means for resiliently resisting side or lateral movement.

With these and other objects in view the invention comprises certain novel constructions, combinations, and arrangement of parts as will be hereinafter more fully described and claimed.

In the accompanying drawings: Figure 1 is a side view of an automobile with the invention applied thereto. Fig. 2 is a side view of an embodiment of the invention removed, the same being shown on an enlarged scale. Fig. 3 is an edge view of the structure shown in Fig. 2. Fig. 4 is a view similar to Fig. 2, the same being shown on a reduced scale and applied to a vehicle. Fig. 5 is a top plan view of the structure shown in Fig. 2, the rebound plate being removed. Fig. 6 is a detail perspective view of the bag supporting frame, the same being shown on a slightly different scale to that shown in Fig. 4. Fig. 7 is a detail perspective view of a reciprocating pressure member. Fig. 8 is a detail perspective view of a side pressure plate. Fig. 9 is an assembled view of the reciprocating pressure member, and the side pressure plates. Fig. 10 is an edge view similar to Fig. 3, the pressure member being shown in dotted lines in its side positions.

Referring to the accompanying drawings by numerals, 1 indicates an automobile of any desired kind having axles 2 and 3. Arranged on axle 3 is a shock absorber 4, while arranged on axle 2 is a slightly differently formed shock absorber. If desired however a shock absorber similar to shock absorber 4 could be used. In the drawing shock absorber 4 is connected with spring 5, though if desired it could be connected directly to the body of the automobile 1, or any other desired arrangement could be utilized.

Arranged on the automobile 1 at any desired place is a tank 6 which is preferably divided into a plurality of compartments, each compartment being connected by a pipe 7 to the bag of one of the shock absorbers 4. Preferably there are used four shock absorbers on an ordinary automobile or other similar vehicle, one absorber for each wheel. Of course a larger or smaller number could be used as desired. A valve 8 is provided for the bag of the shock absorber 4 which may be an ordinary valve, as shown in Fig. 5, or may be a connecting valve for connecting pipe 7 with the bag of the absorber 4. If the tank 6 is connected with the air bag of the shock absorber 4 all of the air in the air bag, the respective pipe 7, and the particular compartment of tank 6, will be utilized for resiliently taking up shocks. If any of the pipes 7 are disconnected from the air bags the respective air bags will then act independently and only utilize what air is contained therein. When this arrangement is being used the valve 8 as shown in Fig. 5 is used.

Shock absorber 4 is formed with a supporting frame 9 having a reciprocating frame 10 associated therewith. Frame 9 is formed with a recessed portion 11 for accommodating air bag 12, which air bag is formed with a projection 13 fitting into a recessed portion 14 in reciprocating member 10. The ends of reciprocating frame 10 slidingly engage the upright guiding members 15 and 16, while frame 10 is held in place against lateral displacement by side pressure plates 17 and 18. These side pressure plates 17 and 18 extend through notched portions 19, 20, 21 and 22 of the reciprocating frame 10, and engage the sides of the upright guiding members 15 and 16 for acting as flanges for the frame 10 for guiding the frame in its up and down movement. The side pressure plates 17 and 18 are not rigidly secured to the reciprocating frame 10 but are yieldingly held in place by bolts 23 and 24 each of which passes entirely through the plates 17 and 18 and also through the reciprocating frame 10 for receiving a spring 25. The springs 25 are held properly in place by suitable washers 26, and have the tension thereof regulated by nuts 27. By the arrangement of springs 25 and associated parts the reciprocating frame 10 may be tilted or moved laterally in either direction, and when so moved the springs 10 will yieldingly resist such movement, and return the respective members to their correct position when permitted to do so. Of course, under some circumstances the reciprocating frame 10 may remain stationary and the supporting frame 9 may move transversely. The springs 25 and associated parts will act under these circumstances similarly to the way they act when reciprocating frame 10 is tilted or moved laterally.

Arranged in the reciprocating frame 10 are sockets 28 and 29 having suitable guiding pins positioned therein, the sockets and pins accommodating rebound springs 30 and 31. These springs press against a rebound plate 32 and are held properly in place by suitable guiding pins 33 and 34. The rebound plate 32 is held properly in place by bolts 35, the same passing through plate 32 and the guides 15 and 16.

What we claim is:

1. In a shock absorber, an air bag, a supporting frame therefor, a compression member associated with said supporting frame and means for resiliently resisting lateral movement of said compression member, said means comprising a side member arranged on each side of said compression member but constructed independently thereof and formed so as to engage the sides of said supporting frame, a bolt connecting said side members and a spring interposed between one of said side members and the end of said bolt for resiliently holding said side members against said supporting frame and for resiliently resisting the lateral movement of said compression member.

2. In a shock absorber, an air bag, a supporting frame therefor, a compression frame associated with said supporting frame, a side member arranged on each side of said supporting frame and loosely engaging the sides of said supporting frame and said compression frame, a bolt projecting through said side members at each end thereof and to an equal distance beyond the side members, an enlargement connected with the end of each of said bolts and a spring surrounding each of said bolts, arranged between said enlargements and one of said side members whereby said side members are resiliently clamped to said supporting frame and are resiliently held in position for resisting lateral movement of said compression frame.

3. In a shock absorber, an air bag, a supporting frame for said air bag, a reciprocating compression frame telescopically fitting into said supporting frame and designed to engage said air bag, resilient means for resisting rebound of said compression frame, a bolt, a spring mounted on said bolt and means on said bolt engaging said spring, said supporting frame and said compression frame for causing said spring to resiliently resist lateral movement of said compression frame.

4. In a shock absorber, an air bag, a supporting frame therefor formed with ways on each end, a compression frame engaging said ways and guided thereby, said air bag being interposed between said frames, said compression frame comprising a main body portion and a pair of independent side members, a pair of bolts connecting said side members to said main body portion, a spring for each of said bolts interposed between said main body portion and said side members for resiliently resisting any lateral strain on said compression frame.

5. In a shock absorber of the class described, a supporting frame formed with guide members projecting therefrom, an air bag mounted on said supporting frame, a reciprocating compression frame fitting between said guide members and engaging said bag, a pair of side plates loosely fitting against said reciprocating compression frame and projecting beyond the same for acting as flanges therefor, the ends of said side plates engaging the sides of said guides, and means for resiliently clamping said plates to said reciprocating frame.

6. In a shock absorber of the class described, a supporting frame, an air bag mounted thereon, a reciprocating compression frame adapted to press against said air bag, a pair of side plates arranged on the sides of said reciprocating compression frame and engaging part of said supporting frame for guiding the reciprocating frame in its movement, a retaining member passing through both of said plates and said reciprocating compression frame, and a spring for resiliently holding in position said retaining member.

7. In a shock absorber of the class described, a supporting frame, an air bag mounted thereon, a reciprocating frame, independent side plates for connecting said reciprocating frame with said supporting frame, a pair of bolts passing through said plates and through said reciprocating frame a spring arranged on each of said bolts, and means for varying the tension of said springs.

8. In a shock absorber of the class described, a supporting frame, a reciprocating frame, a guiding plate arranged loosely on each side of said reciprocating frame for guiding the reciprocating frame in its movement, an air bag arranged between said reciprocating frame and said supporting frame, a pair of bolts for connecting said side plates with said reciprocating frame, a spring arranged on one end of each of said bolts, and means for adjusting the tension of said springs.

In testimony whereof we affix our signatures in presence of two witnesses.

THOMAS J. MULLEN.
THOMAS F. BRENNAN.

Witnesses:
J. H. SEARLE,
FRANK J. MULLEN.

Copies of this patent may be obtained for five cents each, by addressing the "Commissioner of Patents, Washington, D. C."